March 17, 1970   E. W. MOLLOY   3,501,211
BEARING CAGE

Filed Sept. 11, 1968   2 Sheets-Sheet 1

INVENTOR
Edward W. Molloy
BY
F. J. Fodale
ATTORNEY

March 17, 1970  E. W. MOLLOY  3,501,211
BEARING CAGE

Filed Sept. 11, 1968  2 Sheets-Sheet 2

INVENTOR.
Edward W. Molloy
BY
F. J. Fadale
ATTORNEY

United States Patent Office 3,501,211
Patented Mar. 17, 1970

3,501,211
BEARING CAGE
Edward W. Molloy, Port Clinton, Ohio, assignor to
General Motors Corporation, Detroit, Mich., a
corporation of Delaware
Filed Sept. 11, 1968, Ser. No. 759,056
Int. Cl. F16c 19/20
U.S. Cl. 308—217                                 16 Claims

ABSTRACT OF THE DISCLOSURE

A unit-handled assembly of cage and rolling contact antifriction elements in which the case is of a one-piece sheet metal construction. The two-way retention is provided by designing the cage with an even number of cross bars with adjacent cross bars having generally U-shaped portions bent alternatively in opposite directions out of the general plane of the cage.

---

This invention relates generally to antifriction bearings and more specifically to a unit-handled assembly of a one-piece sheet metal cage and rolling contact antifriction elements in which antifriction elements are retained in both directions. The economical advantage of a one-piece sheet metal cage has long been recognized and various designs of unit-handled assemblies in which a one-piece sheet metal cage provided two-way retention have been heretofore attempted. See for instance the U.S. patents to Kilayin 2,359,120, Benson 3,240,543, Pitner 3,163,478, Jahn 3,240,542, Schaeffler 3,314,738, and Neese 3,226,170. Broadly, the object of my invention is to provide a unit-handled assembly having an improved one-piece sheet metal cage capable of two-way retention. By "improved," I mean incorporating the following combination of features which is not disclosed in any of the above patents nor is incorporated in any other design of which I am aware.

The first of the features to be included in the combination is a minimum displacement of any portion of the cage from the starting blank which in the case of a thrust bearing is a flat disc or annulus, in the case of a cylindrical bearing is a cylinder or flat strip and in the case of a tapered bearing is generally a conical sleeve. The advantages of minimum displacement are that it minimizes the possibility of distorting the undisplaced portions of the blank, it minimizes distortion resulting from a subsequent heat treatment which is usually required of sheet metal cages, and it either reduces the size of the starting blank and therefore, scrap and waste or minimizes the thinning of the displaced portions.

The second feature included in the combination is a location of guide surfaces on the cage at the pitch plane of the bearing and maximizing the area of these surfaces for improved guidance. Stating it another way, the object of my invention is to provide a cage of simple design which incorporates at least the above two features and in such a way as to include one without sacrificing the other.

Generally, my improvement to the state of the art on one-piece sheet metal cages and roller assemblies structurally manifests itself in a cage in which an even number of cross bars have portions alternately displaced in opposite directions from the main body or starting blank of the cage. The main body of the cage is located at the pitch plane of the bearing thereby providing an ample area of guide surface for the rollers at this location. By altering the direction of the cross bar displacements, I am able to provide two-way retention and since the main body of the cage is located at the pitch plane of the bearing, the displacements are minimized.

This general object and features of the invention as well as more specific objects and additional features will become apparent to those skilled in the art as the disclosures are made in the following detailed description of preferred embodiments of the inventions as illustrated in the accompanying sheets of drawings in which.

ROLLER THRUST BEARING

Figure 1:
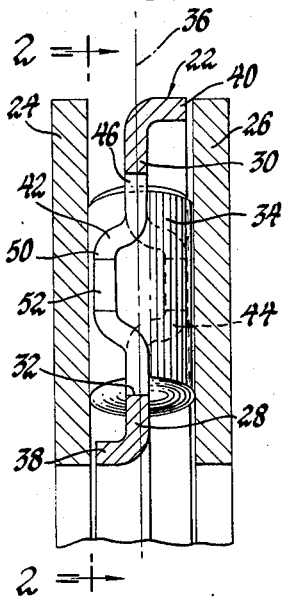
FIGURE 1 is a cross section through a cylindrical needle roller thrust bearing having a unit-handled assembly of cage and rolling contact antifriction elements in accordance with a first embodiment of my invention.

Referring now to the drawings and more specifically to FIGURE 1, the first embodiment of my invention is directed to a cylindrical roller thrust bearing. The unit-handled assembly of cage and rollers is indicated generally at 22 and is shown in conjunction with two annular thrust plates or washers 24 and 26. While I have shown the thrust plates 24 and 26 as pieces separate from the assembly 22, it is to be understood that in some applications, it may be desirable to incorporate one or both of the annular thrust washers into a unit-handled relationship with the caged roller assembly 22. The presence or absence of a unit-handled relationship between the thrust plates and the caged rollers is immaterial to my invention, however, the thrust plates have been included to illustrate an additional desirable feature as will hereinafter more fully appear.

Figure 2:
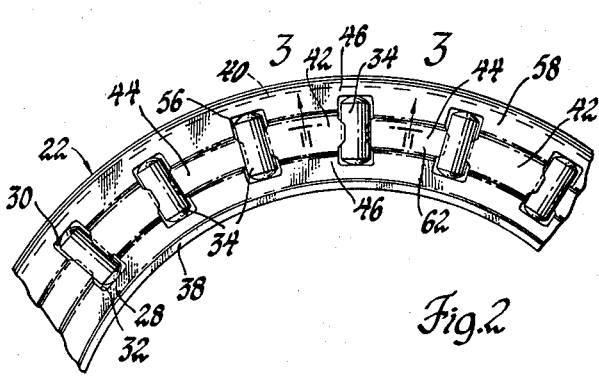
FIGURE 2 is a view taken along the line 2—2 of FIGURE 1 and looking in the direction of the arrows showing the unit-handled assembly of cage and rollers.

As can be seen from FIGURES 1 and 2, the cage is of one-piece sheet metal construction and comprises radially inwardly and radially outwardly end rings 28 and 30, respectively, interconnected by a number of integral cross bars which form windows 32 adapted to receive and circumferentially space a number of rollers 34. The rollers 34 rotate about their axes which lie in a common pitch plane identified at 36 and orbit in this plane about the center of the bearing. Each cross bar has end portions adjacent the end rings and generally coplanar with them.

The midportion or center of each cross bar, however, is bent out of the general plane of the end rings into a generally U-shaped configuration. One cross bar, such as 42, is bent in one direction or to the left as shown in solid lines in FIGURE 1 with the adjacent cross bar, such as 44 (behind the roller 34) being bent in the opposite direction or to the right as shown in dotted lines. The cage also includes oppositely bent integral annular flanges 38 and 40 which cooperate with the thrust washers 24 and 26, respectively. The description of this function is best understood after a detailed description of the cage cross bars and their retention of the rollers 34.

Referring to FIGURE 2, the alternate bending of the cross bars is indicated with the cross bars 42 being raised or bent out of the plane of the drawing and the cross bars 44 being dropped or bent into the plane of the drawing. An important feature of the cage is that there must be an even number of cross bars.

Figure 3:
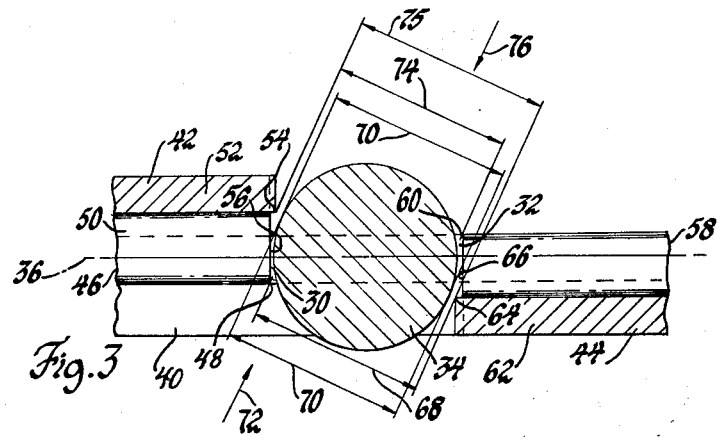
FIGURE 3 is an enlarged view taken along the line 3—3 of FIGURE 2 and looking in the direction of the arrows showing the relationship of a roller to adjacent cross bars.

FIGURE 3 is enlarged to more clearly illustrate the important relationships between the configuration of the two adjacent cross bars 42 and 44 and the roller 34 retained in the window 32 between them. As mentioned aove, each cross bar has end portions coplanar with the end rings, that is, in the general plane of the cage. Sheet metal has some thickness and in a sense cannot be in a plane, and therefore, the end rings and the end portions of the cross bars intersect the pitch plane 36 of the bearing. It is important that the cross bar end portions include a retaining edge 48 on the side of the pitch plane opposite to the generally U-shaped bent portion of the cross bar. The cross bar 42 shown to the left of the roller 34 in FIGURE 3 has end portions 46. The pitch plane 36 approximately bisects the end portions 46 so that the edges 48 on them are spaced below the pitch plane 36 about half the thickness of the sheet stock of which the cage is made. The central portion of the cross bar 42 is generally U-shaped. It is bent out of the general plane of the cage (and consequently out of the pitch plane 36) in the opposite direction. Note that the part 52 of the U-shaped portion 50 which is parallel to the pitch plane 36 is wider and provides a retaining edge 54 which is above the pitch plane. Edge 54 is spaced a greater distance above the pitch plane than edge 48 is spaced below it. The side walls 56 of the end portions 46 are preferably perpendicular and provide a running contact surface for the roller 34.

The cross bar 44 similarly has end portions 58 in the general plane of the cage which intersects the pitch plane 36. The retaining edges 60 on the end portions 58 are spaced about half the stock thickness above the pitch plane 36 on the same side as edge 54 and on the side opposite to the edges 48 on the end portions 46 of the cross bar 42. The central U-shaped portion of cross bar 44 also extends away from the pitch plane 36 in the opposite direction with its parallel part 62 providing a retaining edge 64 below the pitch plane 36. The side walls 66 of the end portions 58 like side walls 56 are preferably perpendicular and provide a running contact surface for the roller 34.

To summarize the relationship of edges 48, 54, 60, 64 to the pitch plane, the edges 48 and 64 are on adjacent cross bars, are on the same side of the pitch plane (below in FIGURE 3) and on the end portions and central portions, respectively. The edges 54 and 60 also on adjacent cross bars are on the opposite side (above in FIGURE 3) and are on the central portion and end portions, respectively.

For retainment, this placement of the edges is important as is the distance between certain of them. The edges 48 and 64 on adjacent cross bars 42 and 44, respectively, are spaced apart less than the diameter of the roller 34 so as to provide retention in one direction. In FIGURE 3, this distance is indicated at 68 with the diameter of the roller indicated at 70. In practice, the dimension 68 is a few thousandths less than the roller diameter 70 so that the roller 34 may be "snapped" into the pocket or window 31 past the edges 48 and 64 with the cross bars being sufficiently resilient to elastically deform, allow the passage of the roller 36, and spring back to their original shape substantially without any permanent deformation or distortion. Note the roller 34 is inserted in the direction of the arrow 72 which is skewed with respect to the pitch plane 36 and that the retaining edges 48 and 64 are contained in a common plane which is skewed with respect to the pitch plane 36 due to the drop center on cross bar 44.

Similarly, the edges 54 and 60 are spaced a distance 74 which is slightly less than the roller diameter 70 to provide roller retainment in the opposite direction. The roller 34 may alternatively be inserted from the opposite side of the cage in a generally skewed direction indicated by the arrow 76. If the cage is symmetrical about the pitch plane 36 and the alternately raised centers and dropped centers 48 and 50 are equally offset, the dimensions 68 and 74 are equal. It is not critical, however, that they be equal. The above-described retainment wherein the retaining edges for a given direction are on the same side of the pitch plane and in a plane skewed with respect to the pitch plane, I shall refer to as "skewed retainment," and the edegs as skewed retainment edges.

Another preferable relationship between the edges 48, 54, 60, and 64 is incorporated into the cage while maintaining the "skewed retainment." The preferable relationship I shall refer to as the "criss cross" dimensions. One "criss cross" dimension 75 is the distance between the edges 54 and 64 on adjacent cross bars and more specifically on the wider parallel parts of the offset centers on the adjacent cross bars. The second "criss cross" dimension is between the edges 48 and 60 on the end portions of adjacent cross bars. Both of these "criss cross" distances are greater than the distance between faces 56 and 66 on the end portions of adjacent cross bars so that the faces 56 and 66 are the guiding surfaces for the roller 34. This is especially important in connection with needle rollers or rollers having a relatively large length-to-diameter ratio because such rollers must be guided from the cross bars. Recall that the cage had oppositely bent flanges 38 and 40. The flange 38 is dimensioned to contact thrust washer 24 before the roller 34 contacts either edges 48 or 64. In other words, once the roller 34 is snapped into the window 32, the edges 48 and 64 have served their function of retainment. After bearing is applied, that is, placed in its environment, the rollers do not contact these edges again but rather contact the faces 56 and 66 for guidance.

Similarly, the flange 40 is dimensioned to contact thrust washer 26 to limit the movement of the cage with respect to the rollers and prevent any roller such as roller 34 from contacting edges 54 and 60, when the bearing is operating. Thus it can be seen that this emodiment provides a unit-handled thrust bearing assembly of a one-piece sheet metal cage and rollers in which the displacement of certain portions of the cross bars from the main body of the cage (the blank for which in this case would be a flat disc or annulus) is minimized. Therefore, the distortion to any part of the cage during the forming operation is minimized as is distortion in a subsequent heat treat minimized. Also since the cross bar portions are displaced at a minimum distance, either the distortion of the inner and outer flanged end rings as they are adjusted to a new circumference is minimized or should they be held constant, the thinning of the cross bars is minimized. The location of the main body portion in the pitch plane of the bearing provides a substantial surface for guiding the rollers at this location. Note that it is important in a needle bearing which has relatively high length-to-diameter ratio rollers to provide maximum roller guidance from the cross bars and preferably at or near the pitch plane. Other features included in this embodiment are the ability to snap the rollers into the cage windows from either side and provision for maintaining the roller retaining edges out of contact with the rollers during operation.

It should be apparent to those skilled in the art that while the above-described embodiment specifically disclosed a needle roller thrust bearing assembly, it can be modified should a square or tapered roller be desired in certain applications of a roller thrust bearing.

BALL THRUST BEARING

Figure 4:
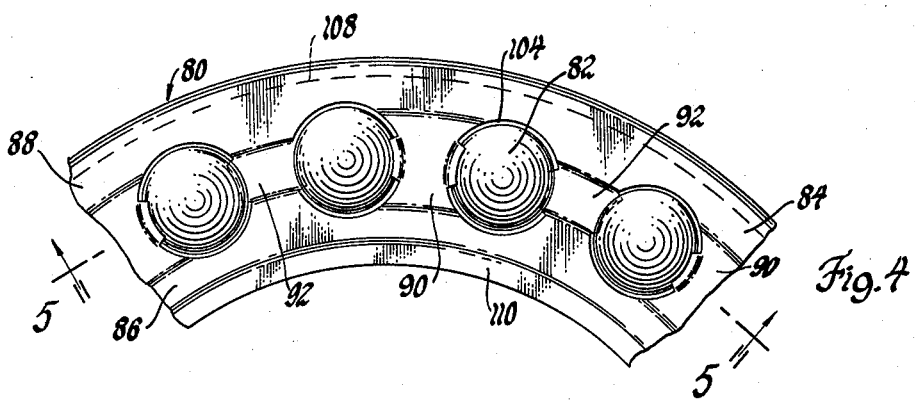
FIGURE 4 is a front view of a ball thrust bearing comprising a unit-handled assembly of cage and rolling contact antifriction elements in accordance with a second embodiment of my invention.
Figure 5:
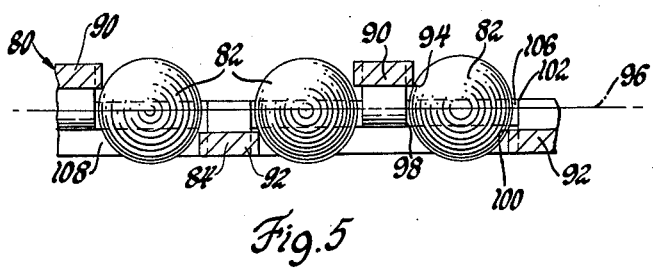
FIGURE 5 is a view taken along the line 5—5 of FIGURE 4 and looking in the direction of the arrows to show the relationship of a ball to adjacent cross bars.

In FIGURES 4 and 5, I have illustrated a ball thrust bearing. Briefly, the cage-ball assembly 80 comprises an even number of balls 82 circumferentially spaced by and retained in a one-piece sheet metal cage or retainer 84. The cage 84 comprises end rings 86 and 88 connected by an even number of integral cross bars, alternate ones of which have raised centers 90 while the other alternate set of cross bars have drop centers 92. As with the roller thrust bearing, the raised center 90 provides a retaining edge 94 which is on one side (above as shown in FIGURE 5) of the pitch plane 96 and retaining edges 98 on the remaining end portions of the cross bar on the opposite side (below) of the pitch plane. The adjacent cross bar has a drop center 92 providing a retaining edge 100 below the pitch plane 96 and a retaining edge 102 above the pitch plane 96. While these edges are curved preferably to a contour similar to the balls rather than straight as with the roller thrust bearing, they nevertheless are so located as to retain the balls by "skewed retainment." That is, the distance between edges 94 and 102 is less than the ball diameter preventing escape of the ball in one direction and the distance between the edges 98 and 100 is less than the ball diameter thereby retaining the ball in the other direction. The ball pockets 104 are of circular outline. That portion 106 of the pocket 104 which remains in the main body portion of the cage, i.e., a cylindrical surface having a height equal to the stock thickness minus the raised center on one side and the drop center on the other which has been bent out of this main body portion provides a guiding surface for the balls. The shortest distance between two diametrically opposed points on this surface which are in the pitch plane is therefore less than the criss cross distances between edges 94 and 100 and between edges 98 and 102. As before, the end rings may include oppositely directed flanges 108 and 110 dimensioned to cooperate with the structure on which the balls roll to prevent the ball from contacting the retaining edges during operation. The ball thrust bearing embodiment thus contains the same features outlined above in connection with the needle thrust bearing. One point, however, deserves mention, that of ball guidance. Ball guidance is not as large a problem as is roller or taper bearings since an insufficiently guided roller skews causing problems whereas a ball does not skew. Likewise a "square" roller, a taper roller, or a ball do not present the same guidance problem as a needle roller which must be guided from the cross bar. However, in all instances, it is preferable to have the guidance at the pitch plane and in this embodiment, the guidance surface at this location has been maximized because of the alternate bending of the cross bars.

RADIAL ROLLER BEARING

Figure 6:
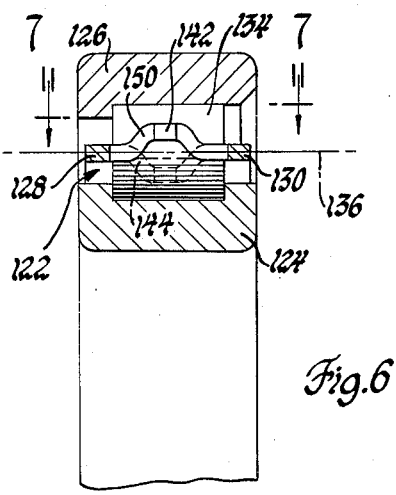
FIGURE 6 is a cross section through a cylindrical roller bearing showing a unit-handled assembly of cage and rolling contact antifriction elements in accordance with a third embodiment of my invention.
Figure 8:
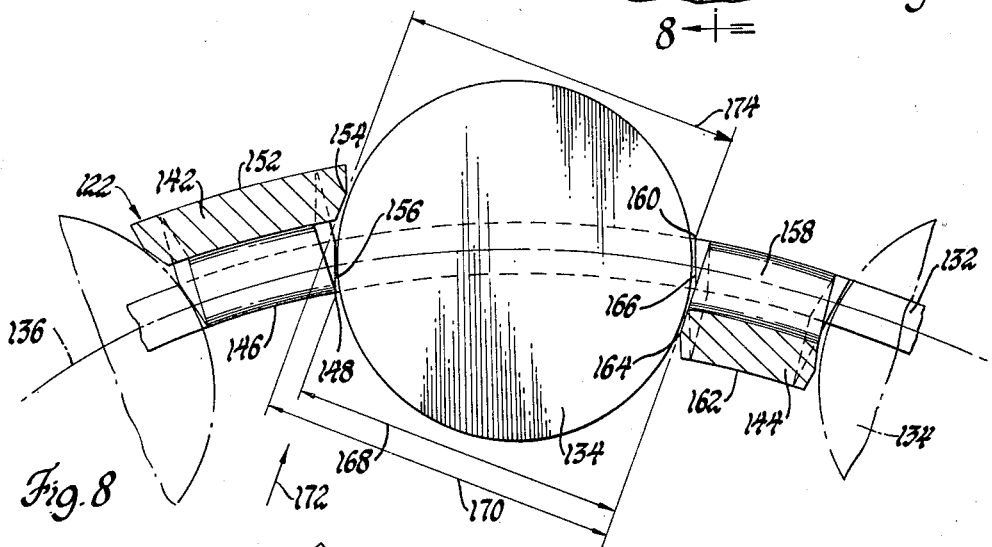
FIGURE 8 is an enlarged view taken along the line 8—8 of FIGURE 7 and looking in the direction of the arrows showing the relationship of a roller to adjacent cross bars of the cage.

Referring now to FIGURES 6 and 8, the next embodiment of my invention is directed to a cylindrical or radial roller bearing. The unit-handled assembly of cage and rollers is indicated generally at 122 and is shown in conjunction with a double shouldered inner race 124 and a single shouldered outer race 126. I have shown the races 124 and 126 as it may be desirable to incorporate one of them into a unit-handled relationship with the caged roller assembly 122. The presence of this additional unit-handled relationship is an additional feature of this embodiment and will be more fully explained below.

Figure 7:
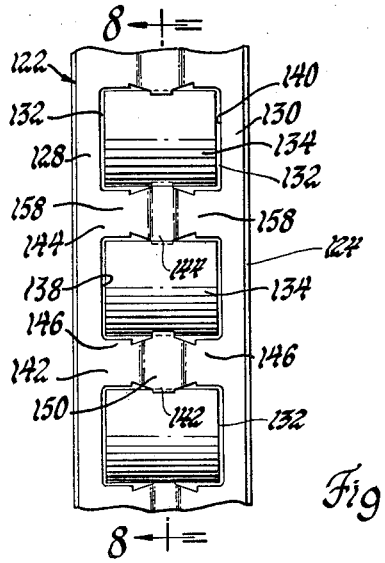
FIGURE 7 is a view taken along the line 7—7 of FIGURE 6 and looking in the direction of the arrows showing the unit-handled cage and roller assembly.

As can be seen from FIGURES 6 and 7, the cage is of one-piece sheet metal construction and comprises end rings 128 and 130 interconnected by an even number of integral cross bars which form windows 132 adapted to receive and circumferentially space a number of rollers 134. The rollers 134 rotate about their axes which lie in a common pitch plane identified at 136 and orbit in this plane about the center of the bearing. The pitch plane for a radial roller bearing is a cylindrical plane contra to that for a thrust bearing which is flat. The pitch plane in a radial bearing is commonly referred to as the pitch circle. Each cross bar has end portions adjacent the end rings and generally coplanar with them. The midportion or center of each cross bar, however, is bent out of the general plane of the end rings into a generally U-shape configuration. One cross bar, such as 142, is bent in one direction or radially outwardly as shown in solid lines in FIGURE 1 with the adjacent cross bar, such as 144 (behind the roller 134) being bent in the opposite direction or radially inwardly as shown in dotted lines.

Referring to FIGURE 7, the alternate bending of the cross bars is indicated with the cross bars 142 being raised or bent out of the plane of the drawing and the cross bars 144 being dropped or bent into the plane of the drawing. As before, in this cage, there must be an even number of cross bars.

FIGURE 8 is enlarged to more clearly illustrate the important relationships between the configuration of the two adjacent cross bars 142 and 144 and the roller 134 retained in the window 132 defined by them. The cross bar 142 shown to the left of the roller 134 in FIGURE 8 has end portions 146 which straddle the pitch plane 136 so that their radially inward edges 148 are spaced radially inwardly of the pitch plane 136. The central portion of the cross bar 142 is generally U-shaped. It is bent out of the general plane of the cage (and consequently out of the pitch plane 136) in the opposite direction. The central U-shaped portion 150 of the cross bar includes an arcuate part 152 which is concentric with and radially spaced outwardly from the pitch plane 136. The arcuate part 152 is widened circumferentially providing a retaining edge 154 radially outwardly of the pitch plane. The side walls 156 of the end portions 146 are perpendicular or radial depending on whether the starting blank is a cylinder or a strip.

The cross bar 144 similarly has end portions 158 in the general plane of the cage which intersects the pitch plane 136. The retaining edges 160 on the end portions 158 are spaced about half the stock thickness radially outwardly of the pitch plane 136 as is the edge 154 on the adjacent cross bar 142. The central U-shaped portion of cross bar 144 extends away from the pitch plane 136 in the opposite direction with its arcuate part 162 circumferentially widened to provide a retaining edge 164 radially inwardly of the pitch plane 136. The side walls 166 of the end portions 158 like side walls 156 may be either perpendicular or radial.

To summarize the relationship of edges 148, 154, 160, 164 to the pitch plane, the edges 148 and 164 are on adjacent cross bars, are on the same side of the pitch plane (radially inward in FIGURE 8), and on the end portions and central portion, respectively. The edges 154 and 160 also on adjacent cross bars are on the opposite side (radially outward in FIGURE 8) and are on the central portion and end portions, respectively.

For retainment in one direction, the edges 148 and 164 on adjacent cross bars 142 and 144, respectively, are spaced apart less than the diameter of the roller 134. This distance is indicated at 168 with the diameter of the roller indicated at 170 in FIGURE 8. As before, the dimension 168 is sufficiently less than the roller diameter 170 so that the roller 134 may be "snapped" into the pocket or window 131 past the edges 148 and 164 with the cross bars being sufficiently resilient to elastically deform, allow the passage of the roller 136, and spring back to their original shape without any permanent deformation or distortion. Note the roller 134 is inserted in the direction of the arrow 172 which is skewed with respect to the pitch plane 136 and that the retaining edges 148 and 164 are contained in a common plane which is skewed with respect to the pitch plane 136 due to the drop center or cross bar 144.

Similarly, the edges 154 and 160 are spaced a distance 174 which is slightly less than the roller diameter 170 to provide roller retainment in the opposite direction. The roller 134 may alternatively be inserted from the opposite side of the cage in a generally skewed direction. Thus this embodiment also provided "skewed retainment" in both directions. While the "criss cross" dimensions, that is, the distance between the edges 154 and 164 and between edges 148 and 160 adjacent cross bars might have been maintained, in this embodiment, they have not. In this regard, note that this embodiment illustrates "square" rollers with substantial end faces which are used to guide the rollers from the axial end walls 138 and 140 of the window 132. Thus this embodiment still provides maximized guidance surface at the pitch plane while providing two-way retainment with a minimum displacement of any of the cage parts with all its attendant advantages, namely, reduced distortion during mechanical processing or subsequent heat treat. The blank for this embodiment whether it be a cylinder or strip is reduced because the portions ultimately forming the end rings move toward each other as the cross bar centers are deformed. Since each cross bar is deformed from the pitch plane a minimum amount, it necessarily follows that the axial adjustment of the end rings is minimal and, therefore, a shorter cylinder or a narrower strip can be used initially.

Another feature of this embodiment centers around the two-way retention and the ability to insert the rollers into the cage window from either direction. Thus with the same cage, it is possible to provide a unit-handled assembly of cage and rollers, or a unit-handled assembly of cage, rollers, and one double-flanged race. Referring momentarily to FIGURE 6, the cage may be placed concentrically with respect to the inner race 24 with the cage window axially aligned with the raceway. The rollers may then be snapped in from the O.D. direction to provide a unit-handled assembly of cage, rollers and one race. The other race 126 obviously cannot be of the double-flanged type. Also while an assembly which includes the inner race, the inner race has been illustrated, it will be apparent to those skilled in the art that the outer race may be included in lieu thereof.

Figure 9:
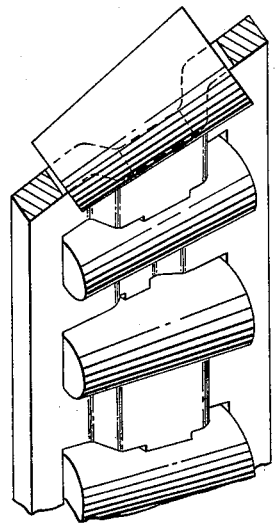
FIGURE 9 is a cross section through a tapered roller bearing having a unit-handled assembly of cage and rolling contact antifriction elements in accordance with a fourth embodiment of my invention.
Figure 10:
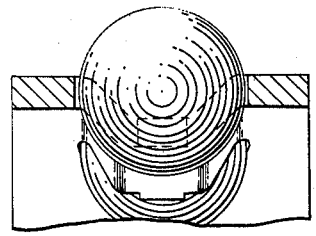
FIGURE 10 is a cross section through a radial ball bearing comprising a unit-handled assembly of cage and rolling contact antifriction elements in accordance with a fifth embodiment of my invention.

Also it will be apparent to those skilled in the art that my invention, an embodiment of which has just been described in connection with FIGURES 6, 7, and 8 is applicable to tapered bearings as shown in FIGURE 9 or radial ball bearings as shown in FIGURE 10. In these last two embodiments which illustrate a unit-handled assembly of cage and antifriction elements, it is likewise possible to include one single double-shouldered race with the assembly.

I claim:

1. A unit-handled assembly of cage and rolling contact antifriction elements comprising in combination,
    an even number of circumferentially spaced rolling contact antifriction elements having a diameter in the rolling direction and rollable about centers located in a pitch plane,
    a one-piece sheet metal cage including end rings intersecting said pitch plane,
    an even number of cross bars connecting said end rings to form windows, each of said cross bars having first portions intersecting said pitch plane and having first retaining edges on one side of said pitch plane, and second portions bent out of said pitch plane in the opposite direction and providing a second retaining edge on the opposite side of said pitch plane, said second portions on adjacent cross bars being bent in opposite directions away from said pitch plane,
    one of said elements being disposed in each of said windows, said first and second retaining edges on adjacent cross bars on one side of said pitch plane being spaced apart a distance less than the diameter of the antifriction element to retain the roller in one direction and said second and first retaining edges on adjacent cross bars on the opposite side of said pitch plane being spaced apart a distance less than the diameter of the antifriction element to retain the roller in the opposite direction whereby a unit-handled assembly of a one-piece sheet metal cage and antifriction elements is provided.

2. The unit-handled assembly as defined in claim 1 wherein said each cross bar has end portions adjacent said end rings of substantially uniform cross section, said end portions intersecting said pitch plane and providing said first retaining edges, and wherein said bent portion on each cross bar is generally U-shaped and has a widened part parallel to said pitch plane, said widened part providing said second retaining edge.

3. The unit-handled assembly as defined in claim 1 in which a guidance surface for said antifriction element is provided by a major portion of each window, said guidance surface being located substantially at the pitch plane.

4. The unit-handled assembly as defined in claim 2 in which a guidance surface for said antifriction element is provided by a major portion of each window, said guidance surface being located substantially at the pitch plane.

5. A unit-handled thrust bearing assembly comprising,
    an even number of circumferentially spaced antifriction elements orbitable about a common center in a pitch plane, each of said elements being rollable about axes in said plane which intersect said center,
    a unitary sheet metal cage having an annular generally flat body including inner and outer end rings and an even number of radial cross bars, each of said radial cross bars having a generally U-shaped central portion bent out of the flat body, each of said U-shaped central portions having a retaining edge and being inverted with respect to an adjacent U-shaped portion, an even number of element-receiving windows defined by said end rings and cross bars with one of said antifriction elements being disposed in each of said windows and retained therein by the edges on said central portions.

6. The unit-handled thrust bearing assembly as defined in claim 5 wherein said sheet metal cage further includes a first annular flange at the margin of said outer end ring and a second annular flange at the margin of said inner end ring, said annular flanges being oppositely oriented and so dimensioned with respect to said antifriction elements that said flanges will contact a surface upon which said antifriction elements are rolling before said antifriction element will contact said edges on said central portions.

7. The unit-handled thrust bearing as defined in claim 6 wherein said antifriction elements are rollers and wherein said cage straddles said pitch plane with a substantial guidance surface for said rollers being provided in said windows substantially at said pitch plane.

8. The unit-handled thrust bearing as defined in claim 6 wherein said antifriction elements are balls and wherein the contour of said windows is circular and follows the contour of said balls.

9. A unit-handled roller thrust bearing assembly comprising,
    a one-piece sheet metal cage having inner and outer rings connected by an even number of integral radial cross bars to form windows therebetween, each of said cross bars having end portions and a central U-shaped portion, said rings and end portions of said cross bars being substantially coplanar; said U-shaped portions on adjacent cross bars being oppositely oriented, each of said U-shaped portions having a widened part parallel to and spaced from said end portions and rings, retaining edges on each of said widened parts on the side toward said end portion and rings, a roller in each of said windows, each of said rollers being retained in a window by one of said edges on each of the widened parts adjacent said window and by an edge on each of said end portions adjacent said window.

10. The unit-handled thrust bearing as defined in claim 9 wherein adjacent cross bars have end portions with parallel confronting walls, said parallel confronting walls being spaced apart less than the retaining edges on adjacent widened parts of said U-shaped portions of said cross bars whereby said walls provide guidance surfaces for said rollers.

11. The unit-handled roller thrust bearing as defined in claim 10 wherein said sheet metal cage further includes a first annular flange at the margin of said outer end ring and a second annular flange at the margin of said inner end ring, said annular flanges being oppositely oriented and so dimensioned with respect to said antifriction elements that said flanges will contact a surface upon which said antifriction elements are rolling before said antifriction element will contact said edges on said central portions.

12. A unit-handled assembly of rolling contact antifriction elements comprising,
a cylindrical, one-piece sheet metal cage having end rings connected by an even number of cross bars with end portions coplanar with the cylindrical plane of said end rings to form windows therebetween,
U-shaped central portions on each of said cross bars bent out of said plane, adjacent U-shaped central portions being oppositely oriented,
an antifriction element in each of said windows, said antifriction element being retained in said window in one direction by an edge on said central portion of a first cross bar on one side of said window and by an edge on said end portions on an adjacent cross bar and retained in the opposite direction by an edge on said end portions of said first cross bar and by an edge on said central portion of said adjacent cross bar, said cage being sufficiently resilient whereby said antifriction elements may be snapped into said windows from either radial direction.

13. The unit-handled assembly as defined in claim 12 and further including a race with integral thrust shoulders and a raceway therebetween.

14. A unit-handled assembly of cage and cylindrical rollers comprising in combination,
an even number of circumferentially spaced cylindrical rollers of substantially constant diameter having their centers located in a pitch circle,
a one-piece sheet metal cage including end rings intersecting said pitch circle,
an even number of cross bars connecting said end rings forming roller receiving windows,
each of said cross bars having first portions intersecting said pitch circle, said first portion including first retaining edges on one side of said pitch circle, each of said cross bars having second portions spaced from said pitch circle on the opposite side from said first retaining edges, said second portions including a second retaining edge on said opposite side, said second portions on adjacent cross bars being spaced from said pitch circle in opposite directions, one of said rollers being disposed in each of said windows and being retained therein in a first direction by a first set of retaining edges comprising said first and second retaining edges on adjacent cross bars which are radially outward of said pitch circle and spaced apart a distance less than said roller diameter, said rollers being retained in the opposite direction by a second set of retaining edges comprising said second and first retaining edges on adjacent cross bars which are radially inward of said pitch circle and spaced apart a distance less than said roller diameter, and said cross bars being sufficiently resilient to allow said rollers to be snapped past either set of said retaining edges and retained in said windows to provide a unit-handled assembly of a one-piece sheet metal cage and rollers.

15. The unit-handled assembly as defined in claim 14 wherein said first portions on said cross bars are the end portions adjacent said end rings and are of substantially uniform cross section and wherein said second portions are the widened parallel parts of generally U-shaped central portions on said cross bars.

16. A unit-handled assembly of caged cylindrical rollers comprising,
a cylindrical, one-piece sheet metal cage having end rings connected by an even number of cross bars with end portions coplanar with the cylindrical plane of said end rings to form windows therebetween,
U-shaped centers on each of said cross bars having portions parallel to and spaced from said plane, said U-shaped centers being oppositely oriented on adjacent cross bars,
a roller disposed in each of said windows, and retained therein in one direction by an edge on the parallel portion of the center of the cross bar on one side of said window and by an edge on said end portions on the cross bar on the other side of said window, said roller being retained in said window in the opposite direction by an edge on said end portions of the cross bar on said one side and by an edge on the parallel portion of the center of the cross bar on said other side, said cage being sufficiently resilient whereby said rollers may be snapped into said windows from either radial direction.

References Cited

UNITED STATES PATENTS 2,848,791    8/1958    Neese _____ 308—217

EDGAR W. GEOGHEGAN, Primary Examiner

FRANK SUSKO, Assistant Examiner